(12) United States Patent
Braun et al.

(10) Patent No.: US 9,779,507 B2
(45) Date of Patent: Oct. 3, 2017

(54) SYSTEM AND METHOD FOR DETERMINING THE ORIENTATION OF A UNIT DOSE PACKAGE

(71) Applicant: Aesynt Incorporated, Cranberry, PA (US)

(72) Inventors: Patrick Joseph Braun, Pittsburgh, PA (US); James Anderson Smith, North Huntingdon, PA (US)

(73) Assignee: AESYNT INCORPORATED, Cranberry, PA (US)

( * ) Notice: Subject to any disclaimer, the term of this patent is extended or adjusted under 35 U.S.C. 154(b) by 222 days.

(21) Appl. No.: 14/557,098

(22) Filed: Dec. 1, 2014

(65) Prior Publication Data

US 2015/0085109 A1    Mar. 26, 2015

Related U.S. Application Data

(63) Continuation of application No. 12/405,716, filed on Mar. 17, 2009, now Pat. No. 8,929,641.

(51) Int. Cl.

| | |
|---|---|
| *G07F 11/16* | (2006.01) |
| *G06T 7/00* | (2017.01) |
| *G01B 11/26* | (2006.01) |
| *H04N 5/225* | (2006.01) |
| *H04N 7/18* | (2006.01) |
| *G06T 7/73* | (2017.01) |

(52) U.S. Cl.
CPC ............ *G06T 7/0042* (2013.01); *G01B 11/26* (2013.01); *G06T 7/0012* (2013.01); *G06T 7/73* (2017.01);

(Continued)

(58) Field of Classification Search
CPC ............ G06F 19/3462; G06F 19/3456; G01N 21/9508; B65B 25/008; B65B 57/10; B65B 5/103; G07F 17/0092; G07F 11/165
See application file for complete search history.

(56) References Cited

U.S. PATENT DOCUMENTS 4,147,930 A * 4/1979 Browne ............... B07C 5/02
198/394
4,691,100 A    9/1987 Kizu et al.
(Continued)

FOREIGN PATENT DOCUMENTS

| WO | WO 2004/039355 A1 | 5/2004 |
|---|---|---|
| WO | WO 2005/005266 A | 1/2005 |
| WO | WO 2005/109119 A | 11/2005 |

OTHER PUBLICATIONS

Banctec LTD, BancTec Prescribes Solutions for the Pharmaceutical Industry, Retrieved from Internet Site www.banctec.com/wp-content/uploads/PPA_uk.pdf, earliest known Internet Archive Wayback Machine date Jun. 20, 2006, pp. 1-2, BancTec Ltd.

(Continued)

*Primary Examiner* — Andrew Moyer
*Assistant Examiner* — Dennis Rosario
(74) *Attorney, Agent, or Firm* — Alston & Bird LLP

(57) ABSTRACT

A method and system are provided for determining an orientation of a unit dose package, such as by determining whether the cavity that houses the medication is facing upwards or downwards. As a result of the determination of the orientation of the unit dose package, a method and system may also be provided for selectively picking a unit dose package, thereby enabling automated restocking of singulated unit dose packages by taking into account the orientation of the unit dose packages.

11 Claims, 4 Drawing Sheets

(52) U.S. Cl.
CPC .............. *G06T 7/75* (2017.01); *G07F 11/165* (2013.01); *H04N 5/2256* (2013.01); *H04N 7/183* (2013.01); *G06T 2207/10004* (2013.01); *G06T 2207/30004* (2013.01); *G06T 2207/30128* (2013.01)

(56) References Cited

U.S. PATENT DOCUMENTS

| | | |
|---|---|---|
| 4,717,042 A | 1/1988 | McLaughlin |
| 4,785,969 A | 11/1988 | McLaughlin |
| 4,847,764 A | 7/1989 | Halvorson |
| 4,857,716 A | 8/1989 | Gombrich et al. |
| 4,967,928 A | 11/1990 | Carter |
| 5,014,875 A | 5/1991 | McLaughlin et al. |
| 5,155,343 A | 10/1992 | Chandler et al. |
| 5,190,185 A | 3/1993 | Blechl |
| 5,259,668 A | 11/1993 | Teufel et al. |
| 5,314,243 A | 5/1994 | McDonald et al. |
| 5,317,652 A | 5/1994 | Chatterjee |
| 5,346,297 A | 9/1994 | Colson, Jr. et al. |
| 5,377,864 A | 1/1995 | Blechl et al. |
| 5,396,054 A | 3/1995 | Krichever et al. |
| 5,405,048 A | 4/1995 | Rogers et al. |
| 5,431,299 A | 7/1995 | Brewer et al. |
| 5,460,294 A | 10/1995 | Williams |
| 5,468,110 A | 11/1995 | McDonald et al. |
| 5,480,062 A | 1/1996 | Rogers et al. |
| 5,502,944 A | 4/1996 | Kraft et al. |
| 5,504,319 A | 4/1996 | Li et al. |
| 5,515,159 A | 5/1996 | Sites et al. |
| 5,520,450 A | 5/1996 | Colson, Jr. et al. |
| 5,523,552 A | 6/1996 | Shellhammer et al. |
| 5,525,788 A | 6/1996 | Bridgelall et al. |
| 5,536,084 A | 7/1996 | Curtis et al. |
| 5,564,593 A | 10/1996 | East, Sr. |
| 5,564,803 A | 10/1996 | McDonald et al. |
| 5,591,952 A | 1/1997 | Krichever et al. |
| 5,593,267 A | 1/1997 | McDonald et al. |
| 5,635,697 A | 6/1997 | Shellhammer et al. |
| 5,635,699 A | 6/1997 | Cherry et al. |
| 5,642,442 A | 6/1997 | Morton et al. |
| 5,661,978 A | 9/1997 | Holmes et al. |
| D384,578 S | 10/1997 | Wangu et al. |
| 5,673,983 A | 10/1997 | Carlson et al. |
| 5,692,518 A | 12/1997 | Baker et al. |
| 5,713,485 A | 2/1998 | Liff et al. |
| 5,716,114 A | 2/1998 | Holmes et al. |
| 5,742,037 A | 4/1998 | Scola et al. |
| 5,745,366 A | 4/1998 | Higham et al. |
| 5,761,877 A | 6/1998 | Quandt |
| 5,778,133 A | 7/1998 | Plesko |
| 5,797,515 A | 8/1998 | Liff et al. |
| 5,805,051 A | 9/1998 | Herrmann et al. |
| 5,805,456 A | 9/1998 | Higham et al. |
| 5,834,749 A | 11/1998 | Durbin |
| 5,842,976 A | 12/1998 | Williamson |
| 5,878,885 A | 3/1999 | Wangu et al. |
| 5,880,443 A | 3/1999 | McDonald et al. |
| 5,880,451 A | 3/1999 | Smith et al. |
| 5,883,806 A | 3/1999 | Meador et al. |
| 5,893,697 A | 4/1999 | Zini et al. |
| 5,905,653 A | 5/1999 | Higham et al. |
| 5,912,818 A | 6/1999 | McGrady et al. |
| 5,927,540 A | 7/1999 | Godlewski |
| 5,940,306 A | 8/1999 | Gardner et al. |
| 5,945,651 A | 8/1999 | Chorosinski et al. |
| 5,971,593 A | 10/1999 | McGrady |
| 6,003,006 A | 12/1999 | Colella et al. |
| 6,003,992 A | 12/1999 | Bergeron Dunn et al. |
| 6,011,999 A | 1/2000 | Holmes |
| 6,021,392 A | 2/2000 | Lester et al. |
| 6,022,124 A * | 2/2000 | Bourn ................ G01N 21/8806 362/231 |
| 6,039,467 A | 3/2000 | Holmes |
| 6,064,759 A | 5/2000 | Buckley et al. |
| 6,065,819 A | 5/2000 | Holmes et al. |
| 6,068,156 A | 5/2000 | Liff et al. |
| 6,109,774 A | 8/2000 | Holmes et al. |
| 6,112,502 A | 9/2000 | Frederick et al. |
| 6,116,461 A | 9/2000 | Broadfield et al. |
| 6,142,376 A | 11/2000 | Cherry et al. |
| 6,151,536 A | 11/2000 | Arnold et al. |
| 6,163,737 A | 12/2000 | Fedor et al. |
| 6,170,230 B1 | 1/2001 | Chudy et al. |
| 6,170,929 B1 | 1/2001 | Wilson et al. |
| 6,175,779 B1 | 1/2001 | Barrett |
| 6,176,392 B1 | 1/2001 | William et al. |
| 6,189,727 B1 | 2/2001 | Shoenfeld |
| 6,219,587 B1 | 4/2001 | Ahlin et al. |
| 6,223,934 B1 | 5/2001 | Shoenfeld |
| 6,256,967 B1 | 7/2001 | Hebron et al. |
| 6,283,322 B1 | 9/2001 | Liff et al. |
| 6,289,656 B1 | 9/2001 | Wangu et al. |
| 6,338,007 B1 | 1/2002 | Broadfield et al. |
| 6,339,732 B1 | 1/2002 | Phoon et al. |
| 6,354,783 B1 | 3/2002 | Stoy et al. |
| 6,361,263 B1 | 3/2002 | Dewey et al. |
| 6,366,696 B1 | 4/2002 | Hertz et al. |
| 6,370,841 B1 | 4/2002 | Chudy et al. |
| 6,435,370 B1 | 8/2002 | Wilson |
| 6,449,927 B2 | 9/2002 | Hebron et al. |
| 6,471,089 B2 | 10/2002 | Liff et al. |
| 6,497,342 B2 | 12/2002 | Zhang et al. |
| 6,499,270 B2 | 12/2002 | Peroni et al. |
| 6,499,665 B1 | 12/2002 | Meunier et al. |
| 6,532,399 B2 | 3/2003 | Mase |
| 6,564,121 B1 | 5/2003 | Wallace et al. |
| 6,581,798 B2 | 6/2003 | Liff et al. |
| 6,585,163 B1 | 7/2003 | Meunier et al. |
| 6,604,019 B2 | 8/2003 | Ahlin et al. |
| 6,609,047 B1 | 8/2003 | Lipps |
| 6,611,733 B1 | 8/2003 | De La Huerga |
| 6,625,952 B1 | 9/2003 | Chudy et al. |
| 6,640,159 B2 | 10/2003 | Holmes et al. |
| 6,650,964 B2 | 11/2003 | Spano, Jr. et al. |
| 6,671,579 B2 | 12/2003 | Spano, Jr. et al. |
| 6,681,149 B2 | 1/2004 | William et al. |
| 6,742,671 B2 | 6/2004 | Hebron et al. |
| 6,749,120 B2 | 6/2004 | Hung et al. |
| 6,755,931 B2 | 6/2004 | Vollm et al. |
| 6,760,643 B2 | 7/2004 | Lipps |
| 6,776,304 B2 | 8/2004 | Liff et al. |
| 6,785,589 B2 | 8/2004 | Eggenberger et al. |
| 6,790,198 B1 | 9/2004 | White et al. |
| 6,805,259 B2 | 10/2004 | Stevens et al. |
| 6,814,254 B2 | 11/2004 | Liff et al. |
| 6,814,255 B2 | 11/2004 | Liff et al. |
| 6,847,861 B2 | 1/2005 | Lunak et al. |
| 6,874,684 B1 | 4/2005 | Denenberg et al. |
| 6,892,780 B2 | 5/2005 | Vollm et al. |
| 6,895,304 B2 | 5/2005 | Spano, Jr. et al. |
| 6,948,662 B2 | 9/2005 | Dvorkis |
| 6,975,922 B2 | 12/2005 | Duncan et al. |
| 6,985,797 B2 | 1/2006 | Spano, Jr. et al. |
| 6,996,455 B2 | 2/2006 | Eggenberger et al. |
| 7,007,846 B2 | 3/2006 | Shellhammer |
| 7,010,389 B2 | 3/2006 | Lunak et al. |
| 7,014,063 B2 | 3/2006 | Shows et al. |
| 7,016,766 B2 | 3/2006 | William et al. |
| 7,040,504 B2 | 5/2006 | Broadfield et al. |
| 7,052,097 B2 | 5/2006 | Meek, Jr. et al. |
| 7,072,737 B2 | 7/2006 | Lunak et al. |
| 7,072,855 B1 | 7/2006 | Godlewski et al. |
| 7,077,286 B2 | 7/2006 | Shows et al. |
| 7,085,621 B2 | 8/2006 | Spano, Jr. et al. |
| 7,092,796 B2 | 8/2006 | Vanderveen |
| 7,093,755 B2 | 8/2006 | Jordan et al. |
| 7,100,792 B2 | 9/2006 | Hunter et al. |
| 7,103,419 B2 | 9/2006 | Engleson et al. |
| 7,111,780 B2 | 9/2006 | Broussard et al. |
| 7,139,639 B2 | 11/2006 | Broussard et al. |
| 7,150,724 B2 | 12/2006 | Morris et al. |
| 7,171,277 B2 | 1/2007 | Engleson et al. |
| 7,218,231 B2 | 5/2007 | Higham |

(56) References Cited

U.S. PATENT DOCUMENTS

| | | | |
|---|---|---|---|
| 7,228,198 | B2 | 6/2007 | Vollm et al. |
| 7,249,688 | B2 | 7/2007 | Hunter et al. |
| 7,348,884 | B2 | 3/2008 | Higham |
| 7,417,729 | B2 | 8/2008 | Greenwald |
| 7,419,133 | B2 | 9/2008 | Clarke et al. |
| 7,426,425 | B2 | 9/2008 | Meek, Jr. et al. |
| 7,502,666 | B2 | 3/2009 | Siegel et al. |
| 7,541,294 | B2 * | 6/2009 | Shirasaka ............ H01L 23/544 257/730 |
| 7,554,449 | B2 | 6/2009 | Higham |
| 7,571,024 | B2 | 8/2009 | Duncan et al. |
| 7,588,167 | B2 | 9/2009 | Hunter et al. |
| 7,747,066 | B2 | 6/2010 | Mulligan |
| 7,748,628 | B2 | 7/2010 | Greyshock |
| 7,756,248 | B2 | 7/2010 | Beckers et al. |
| 7,990,531 | B2 | 8/2011 | Clements et al. |
| 8,009,913 | B2 | 8/2011 | Greyshock |
| 8,036,773 | B2 | 10/2011 | Braun et al. |
| 8,483,867 | B2 | 7/2013 | Braun et al. |
| 2002/0162889 | A1 | 11/2002 | Navon |
| 2002/0196977 | A1 | 12/2002 | Navon |
| 2003/0228057 | A1 | 12/2003 | Paquette |
| 2004/0029362 | A1 | 2/2004 | Liu |
| 2004/0040975 | A1 | 3/2004 | Hunter et al. |
| 2004/0249498 | A1 | 12/2004 | William et al. |
| 2005/0096941 | A1 | 5/2005 | Tong |
| 2005/0103848 | A1 | 5/2005 | Zhu et al. |
| 2005/0226488 | A1 * | 10/2005 | Barry ................... B07C 5/3422 382/141 |
| 2005/0240305 | A1 | 10/2005 | Bogash et al. |
| 2006/0079996 | A1 | 4/2006 | Benouali |
| 2006/0122729 | A1 | 6/2006 | Murphy et al. |
| 2007/0265730 | A1 | 11/2007 | Greyshock |
| 2007/0296963 | A1 | 12/2007 | Parker et al. |
| 2009/0084702 | A1 | 4/2009 | Arnold et al. |
| 2010/0239169 | A1 | 9/2010 | Braun et al. |

OTHER PUBLICATIONS

Canadian Intellectual Property Office, Examiner Requisition for Application No. 2,651,788, May 16, 2013, 3 pages, Canada.
Canadian Intellectual Property Office, Office Action for Application No. CA 2,651,788, dated Apr. 2, 2012, 3 pages.
European Patent Office, Communication Pursuant to Article 94(3) EPC for Application No. 07776973.5, Jul. 3, 2013, 6 pages, The Netherlands.
European Patent Office, Extended Search Report and European Search Opinion for European Application No. 08006591.5, dated May 4, 2012, 6 pages, The Netherlands.
Final Office Action from U.S. Appl. No. 11/755,207 mailed Mar. 2, 2011.
Final Office Action U.S. Appl. No. 11/754,689 dated Jan. 6, 2011.
Hamilton, S. J. et al., "Hyperspectral techniques in analysis of oral dosage forms", Journal of Biomedical Optics, Oct. 2002, pp. 561-570, vol. 7, No. 4. Retrieved from the Internet: http://biomedicaloptics.spiedigitallibrary.org/article.aspx?articleid=1101527.
International Preliminary Report on Patentability for PCT/US2007/011352 mailed Dec. 31, 2008.
International Search Report and Written Opinion for PCT/US2007/011352 mailed Dec. 3, 2008.
International Search Report for PCT/2007/011352, mailed Nov. 8, 2007.
McKesson Automation, Robot-Rx®, Retrieved Jan. 5, 2006 from Internet Site http://www.mckessonautomation.com/wt/auto/tech_forpharmacy_robotrx, pp. 1-2, McKesson Automation.
McKesson, CJW Medical Center Employs Pharmacy Robot to Improve Medication Orders, Pharmacy Week Supplement, Oct. 19, 2003, p. 1 of 1, Richmond Times Dispatch.
McKesson, Robot-Rx™—Nothing is Faster or More Accurate at Dispensing Medications, pp. 1-2, McKesson Automation, 2005.
Non-Final Office Action from U.S. Appl. No. 11/754,689 mailed Aug. 12, 2010.
Non-Final Office Action from U.S. Appl. No. 11/755,207 mailed Sep. 17, 2010.
Notice of Allowance from U.S. Appl. No. 11/382,605 mailed Jul. 19, 2010.
Notice of Allowance from U.S. Appl. No. 11/611,956 mailed May 7, 2010.
Notice of Allowance of U.S. Appl. No. 11/382,605 mailed Jun. 16, 2011.
Notice of Allowance U.S. Appl. No. 11/754,689 dated Mar. 31, 2011.
Office Action from U.S. Appl. No. 11/382,605 mailed Mar. 31, 2010.
Office Action from U.S. Appl. No. 11/382,605 mailed Mar. 13, 2009.
Office Action from U.S. Appl. No. 11/382,605 mailed Oct. 5, 2009.
Office Action from U.S. Appl. No. 11/611,956 mailed Apr. 2, 2009.
Office Action from U.S. Appl. No. 11/611,956 mailed Dec. 10, 2009.
Tommiea P. Jackson, Robot Does the Work of a Pharmacist in Record Time, Nov. 21, 2003, p. 1 of 1, USA Today.
*Trialpack—Flexible Product Handling*, http://fleximation.com/trialpack/vision.html (visited Mar. 16, 2009).
*Trialpack 640—Robot Blister Packaging System for Clinical Trials*, http://www.fleximation.com/trialpack/tpac600.html (visited Mar. 16, 2009).
*Trialpack 640—Technical Data and Features*, http://fleximation.com/trialpack/600_technical_data.html (visited Mar. 16, 2009).
United States Patent and Trademark Office, Notice of Allowance and Fee(s) due for U.S. Appl. No. 12/405,716, Sep. 2, 2014, 21 pages, USA.
United States Patent and Trademark Office, Notice of Allowance for U.S. Appl. No. 12/906,398, Apr. 3, 2013, 9 pages, USA.
United States Patent and Trademark Office, Office Action for U.S. Appl. No. 12/906,398, dated Jun. 22, 2012, 22 pages, USA.
United States Patent and Trademark Office, Office Action for U.S. Appl. No. 12/906,398, Dec. 20, 2012, 11 pages, USA.
United States Patent and Trademark Office, Office Action for U.S. Appl. No. 12/405,716, May 2, 2014, 21 pages, USA.
United States Patent and Trademark Office, Office Action for U.S. Appl. No. 12/405,716, Sep. 26, 2013, 17 pages, USA.
United States Patent and Trademark Office, Office Action for U.S. Appl. No. 12/405,716, dated Oct. 25, 2012, 15 pages, USA.
United States Patent and Trademark Office, Office Action for U.S. Appl. No. 12/405,716, dated May 30, 2012, 30 pages, USA.
Zhao et al., Tablets Vision Inspection Approach Using Fourier Descriptors and Support Vector Machines, The 9th International Conference for Young Computer Scientists, 2008 [on-line], Nov. 18-21, 2008, pp. 1743-1748. Retrieved from http://ieeexplore.ieee.org/xpls/abs_all.jsp?arnumber=4709237&tag=1.

* cited by examiner

SYSTEM AND METHOD FOR DETERMINING THE ORIENTATION OF A UNIT DOSE PACKAGE

CROSS-REFERENCE TO RELATED APPLICATIONS

This application is a continuation of, and claims the benefit of, U.S. patent application Ser. No. 12/405,716 filed Mar. 17, 2009, the contents of which are incorporated herein in its entirety by reference.

TECHNOLOGICAL FIELD

Embodiments of the present invention relate generally to the processing of unit dose packages and, more particularly, to systems and methods for determining the orientation of a unit dose package.

BACKGROUND

Medications may be packaged in various forms including in bottles, jars and other packages. A unit dose package is one common form in which medication is packaged. In this regard, a unit dose package refers to a unit dose of medication for one or more oral solids of the same or different strength, form or type that has been sealed in the package. One example of a unit dose package is a unit dose blister in which the medication may be disposed in a vinyl and foil package in which the vinyl defines a cavity that generally conforms to the shape of the medication. The vinyl may be sealed to the foil which offers a relatively flat support panel on which information relating to the medication may be printed, for example, on the opposite side from the vinyl cavity that houses the medication.

FIG. 1 illustrates several examples of unit dose blisters. As shown, a unit dose blister may include a support panel having opposed first and second sides 10, 12 with the unit dose medication 14, e.g., one or more oral solids, being positioned proximate the first side of the support panel and an identification code 16, e.g., a bar code or text including any number and combination of alphanumeric characters, including information identifying the unit dose medication being presented on the second side of the support panel.

When unit dose medications are packaged as unit dose blisters, they are typically packaged with several unit dose blisters per blister card. Each unit dose blister is connected to the other unit dose blisters of the blister card, but perforations are generally defined between the unit dose blisters to permit each unit dose blister to be separated from the remainder of the blister card. A singulated blister is one that has been separated from a blister card, generally along a perforation.

As described above and as depicted in FIG. 1, the medication of a unit dose blister is housed in a contoured cavity defined, for example, by a vinyl or plastic housing. As such, a unit dose blister may have two distinct orientations, namely, a first orientation in which the unit dose blister rests upon the cavity with the support member being positioned upwardly and a second orientation in which the unit dose blister is supported upon the support member with the cavity extending upwardly therefrom. In a number of instances, it would be desirable to determine the orientation of a unit dose blister, that is, to determine whether the unit dose blister is resting the upon the cavity that houses the medication or upon the support member.

One application in which it would be desirable to determine the orientation of a unit dose blister relates to the handling of a unit dose blister by a robotic system. In this regard, robotic systems have been developed to facilitate medication retrieval and distribution. One example of such a robotic system is the ROBOT-Rx® system provided by McKesson Automation Inc. and described by U.S. Pat. Nos. 5,468,110, 5,593,267 and 5,880,443, the contents of which are hereby incorporated by reference. The ROBOT-Rx® system is a stationary robotic system that automates the drug storing, dispensing, returning, restocking and crediting process. Unit dose blisters are generally repackaged in bags to be able to be handled by a robotic system, such as the ROBOT-Rx® system, although other robotic systems may be developed to handle unit dose blisters in their raw form. Typically, a robotic system works with single doses of medications, such as unit dose packages including, for example, unit dose blisters.

With respect to unit dose blisters, the unit dose blisters are generally singulated, that is, the unit dose blisters are generally separated from other unit dose blisters of a blister card, and then stored in trays or other containers dedicated to a particular dosage of a predetermined medication for subsequent access by the robotic system. The tray or other container for a respective medication may be stored in a predefined location such that the robotic system is thereafter able to access the tray or other container and obtain a prescribed number of unit dose blisters of the respective medication in response to instructions dictating the dispensation of the medication.

In some instances, the medication that is dispensed for a patient, such as in a hospital, nursing home or other health care facility, is not consumed and is, instead, returned to the pharmacy. In some settings, for example, up to about 20% of the medication that is dispensed for patients in a health care facility is eventually returned. Upon receiving the returned medication, the medication is generally restocked, such as by placing the unit dose blisters in the respective trays or other containers that house the respective medication.

From at least an efficiency and a cost-effectiveness standpoint, it would be desirable for the medication that is returned to be restocked in an automated fashion. For example, it would be desirable for a robotic system to individually engage a unit dose blister that has been returned, to identify the contents, such as by reading the associated text or barcode, and to then load the unit dose blister in the tray or other container that houses the respective medication. However, because of the two distinct orientations of a unit dose blister, that is, with the cavity facing either upwards or downwards, it would be useful to be able to determine the orientation of the unit dose blister since a robotic system may be able to more efficiently or reliably pick unit dose blisters in only one of the two orientations. Indeed, in the absence of being able to determine the orientation of a unit dose blister, singulated unit dose blisters may need to be picked and placed into the trays or other containers by technicians, thereby potentially increasing the associated costs.

BRIEF SUMMARY

A method and system are therefore provided according to one embodiment of the present invention for determining an orientation of a unit dose package, such as by determining whether the cavity that houses the medication is facing upwards or downwards. As a result of the determination of the orientation of the unit dose package, a method and system are also provided according to another embodiment of the present invention for selectively picking a unit dose package, thereby enabling automated restocking of singulated unit dose packages in an efficient manner by taking into account the orientation of the unit dose packages.

In one embodiment, a system and method for determining the orientation of a unit dose package are provided. In this regard, a unit dose package may be supported upon a support surface. Light may then be directed, such as from a light source, e.g., an optical fiber or a light emitting diode (LED), at the unit dose package upon the support surface. In this regard, light may be directed along a path that defines an acute angle that is less than a predefined threshold with respect to the support surface. Light may then be detected, such as by a camera, following redirection by the unit dose package. As such, the orientation of the unit dose package may be determined based upon a pattern created by the light following redirection by the unit dose package.

In detecting the light, an image may be captured, such as by means of a camera. It may then be determined if the image includes a predefined pattern indicative the unit dose package having a predetermined orientation. For example, the predefined pattern may be an at least partially annular pattern indicative of the unit dose package being oriented with the cavity housing the medication facing upwards in a direction away from the support surface.

In one embodiment, the support surface may be at least partially translucent. As such, the unit dose package may be backlit through the support surface, such as by means of a back light. As such, the general location of a unit dose package may be determined along with the orientation of the unit dose package.

In accordance with another aspect of the present invention, a system and method are provided for selectively picking a unit dose package based upon the determined orientation of the unit dose package. In this regard, a unit dose package is supported, such as upon a support surface. Light may then be directed at the unit dose package upon the support surface, such as by means of a light source, e.g., an optical fiber or an LED. In directing the light at the unit dose package, the light may be directed along a path that has a component that extends parallel to the support surface. An image formed by the light following redirection by the unit dose package may then be captured, such as by means of a camera. The resulting image permits the orientation of the unit dose package to be determined based upon the pattern, if any, created by the light following redirection by the unit dose package. When the unit dose package is determined to have a predetermined orientation, the unit dose package may then be selectively engaged, such as by means of a picking system, so as to remove the unit dose package from the support surface. As such, the picking system may then identify and place the unit dose package in the tray or other container associated with the respective medication. In instances in which the unit dose package does not have the predetermined orientation, the unit dose package may be re-circulated prior to returning to the support surface for reconsideration of its orientation.

By determining the orientation of a unit dose package, the unit dose package may therefore be handled in an automated fashion. For example, the unit dose package may be stocked and restocked in an automated fashion in order to increase the efficiency with which a robotic system handles singulated unit dose packages.

BRIEF DESCRIPTION OF THE SEVERAL VIEWS OF THE DRAWINGS

Figure 1:
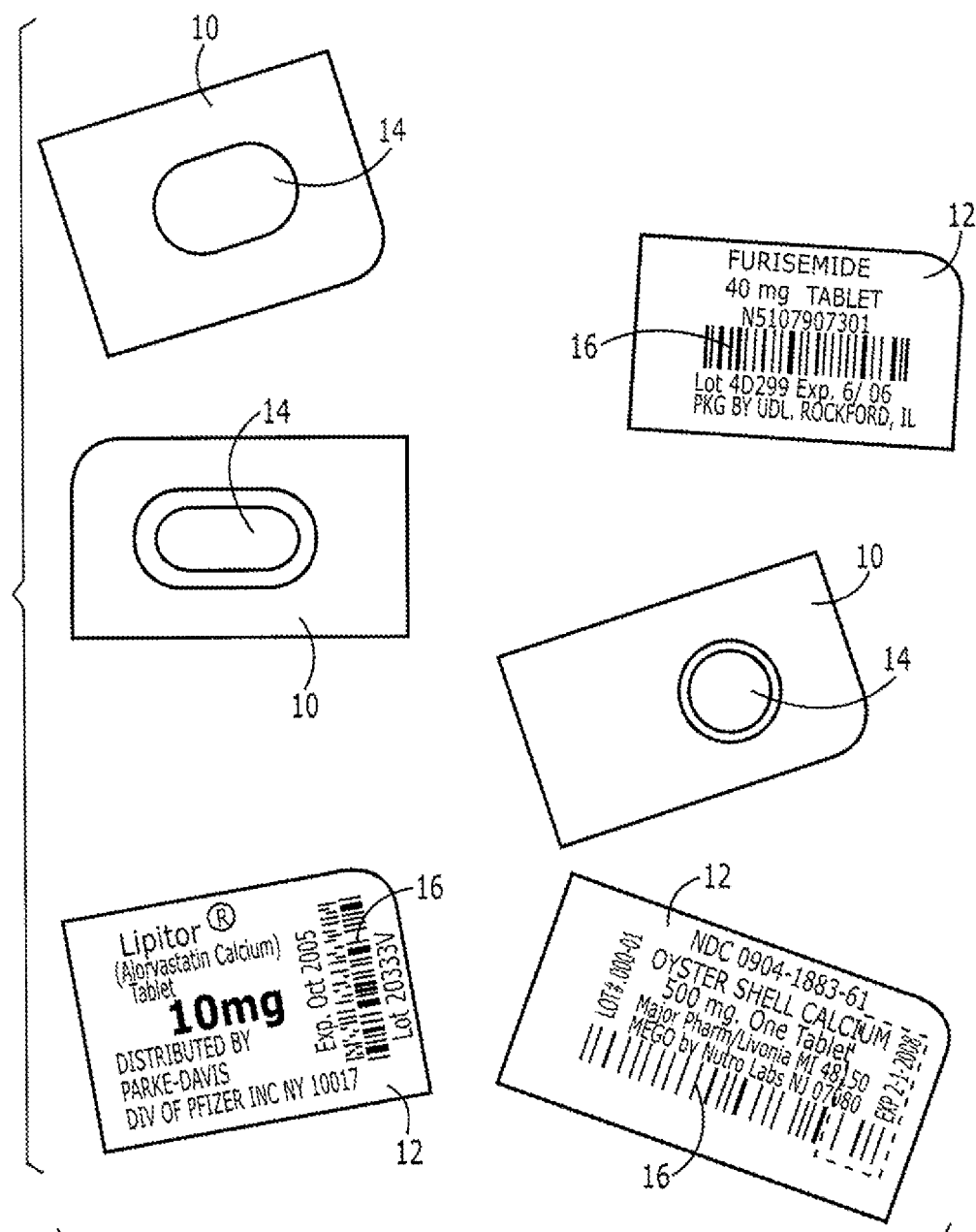
Figure 2:
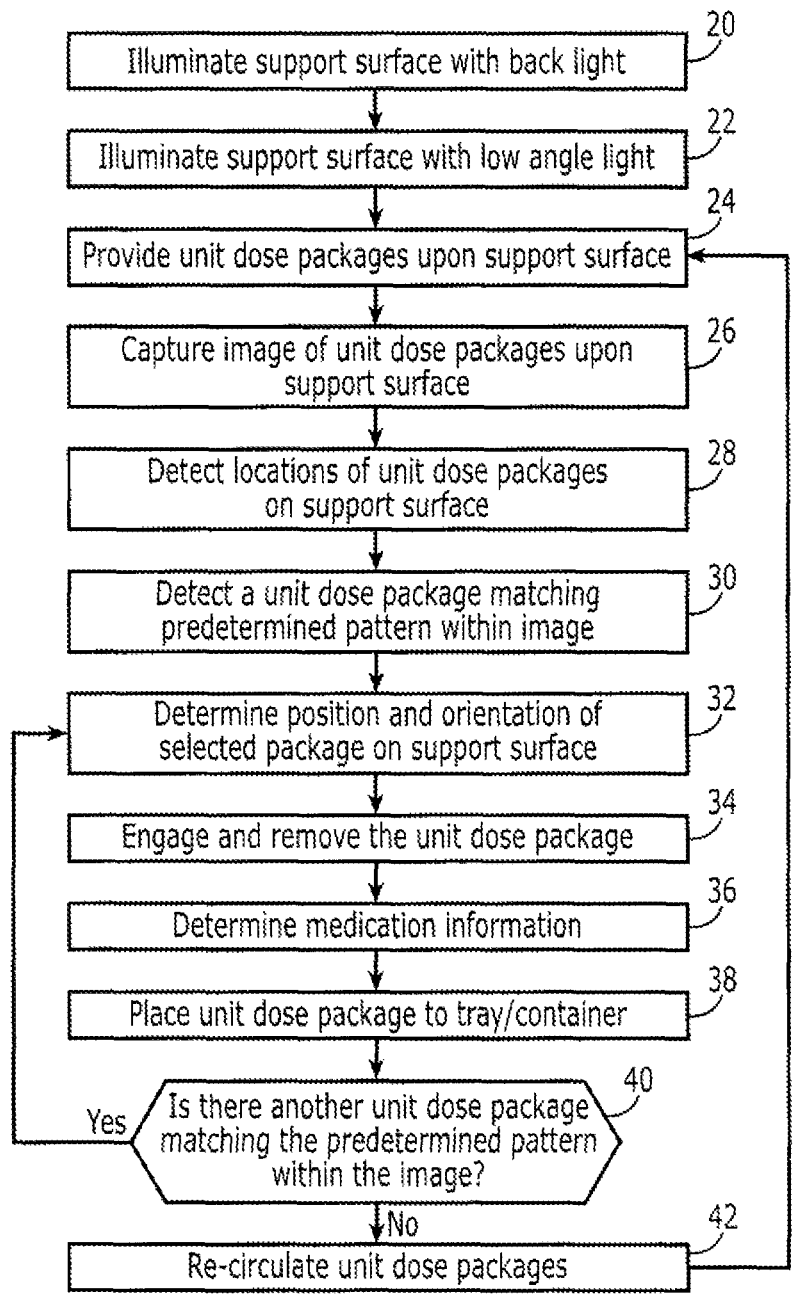
Figure 3:
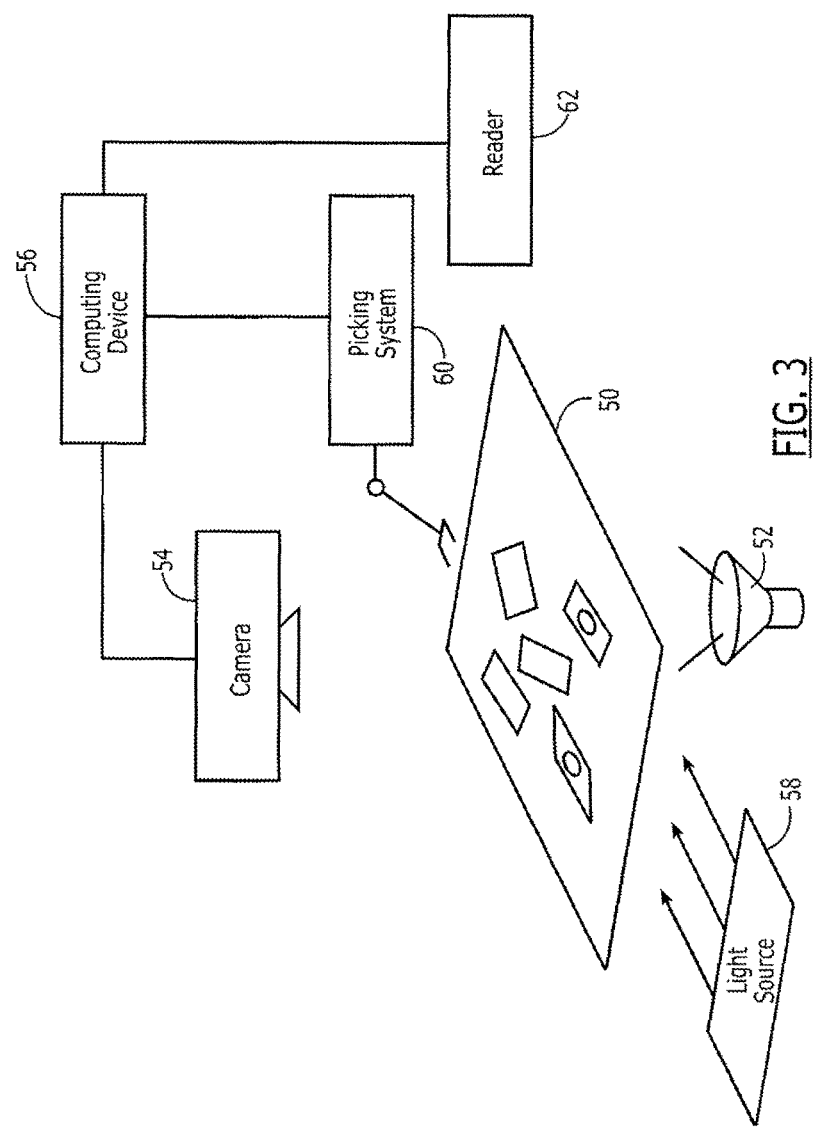
Figure 4:
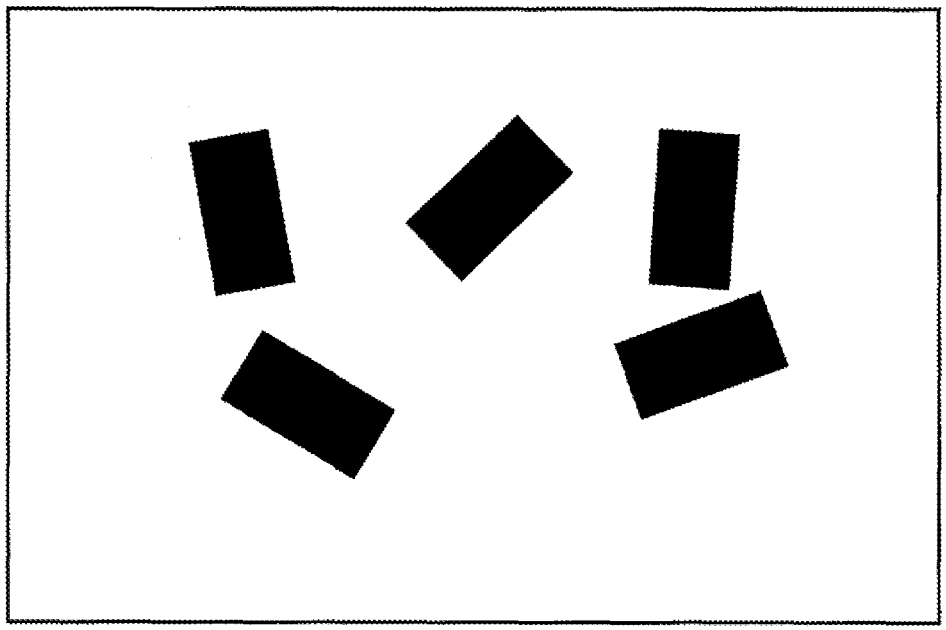
Figure 5:
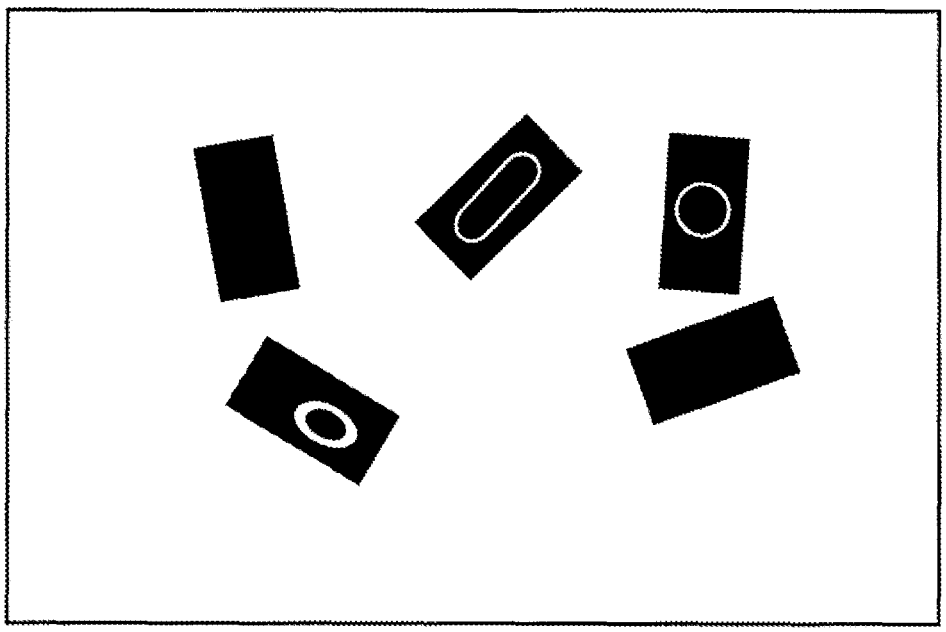

Having thus described the invention in general terms, reference will now be made to the accompanying drawings, which are not necessarily drawn to scale, and wherein:

FIG. 1 illustrates several unit dose blisters;

FIG. 2 is a flow chart of the operations performed in accordance with one embodiment of the present invention;

FIG. 3 is a schematic representation of a system for determining an orientation of a unit dose package and for selectively picking a unit dose package in accordance with embodiments of the present invention;

FIG. 4 is an image representative of the relative locations of a plurality of unit dose packages upon a support surface; and FIG. 5 is an image representative of a unit dose package having a predetermined orientation in accordance with one embodiment of the present invention.

DETAILED DESCRIPTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. Moreover, the term "exemplary", as used herein, is not provided to convey any qualitative assessment, but instead merely to convey an illustration of an example. Thus, use of any such terms should not be taken to limit the spirit and scope of embodiments of the present invention.

A system and method for determining the orientation of a unit dose package, such as a unit dose blister, is provided according to embodiments of the present invention. As described below, the system and method of embodiments of the present invention may be employed in conjunction with robotic systems to facilitate the automated handling and processing of various medications. However, the system and method of other embodiments of the present invention may be employed in other applications, which need not include a robotic system.

As described below, one or more unit dose packages are supported upon a support surface. The support surface may have various configurations and, in one embodiment, may be a conveyer for supporting the unit dose packages. Regardless of its configuration, in instances in which the unit dose packages are to be automatically picked from the support surface, such as by means of a picking system as described below, the support surface of one embodiment is positioned in a predefined location to facilitate access to the unit dose packages.

As also described below, it is desirable to determine the location of each unit dose package upon the support surface. While the location of the unit dose packages may be established in various manners, referring now to operation 20 of FIG. 2, the system 48 of the embodiment depicted in FIG. 3 includes a back light 52 and a camera 54 to facilitate the location determination. The back light 52 is generally positioned proximate the support surface 50, albeit on the opposite side of the support surface from the unit dose packages. In this embodiment, the support surface is at least partially translucent such that light emitted by the back light propagates through and illuminates the support surface.

In addition to determining the location of each unit dose package upon the support surface 50, it may be desirable to determine the orientation of each unit dose package upon the support surface, as also described below. In order to determine the orientation of the unit dose packages, the unit dose packages may also be illuminated by light directed along a path that defines an acute angle of less than a predefined threshold with respect to the support surface, as shown, for example, by operation 22 of FIG. 2. As shown in FIG. 3, for example, the system 48 may include a light source 58 for directing light at the unit dose package from a position laterally disposed with respect to the unit dose packages supported by the support surface. In order to determine the orientation of a unit dose package, the light source is configured to direct light at the unit dose package at a low angle relative to the support surface. In this regard, the light source may be configured to direct light at an angle of less a predefined threshold of 30 degrees with respect to the support surface and, in one embodiment, at an angle of less than a predefined threshold of 10 degrees with respect to the support surface. Regardless of the precise angle, the light that illuminates the unit dose package either extends parallel to the support surface (and, therefore, defines an angle of 0° with respect to the support surface) or at least has a component that extends parallel to the support surface, such as in instances in which the light is directed at a non-zero acute angle with respect to the support surface such that the light may be represented by two orthogonal components with a first component extending parallel to the support surface and a second component extending orthogonal to the support surface. Since the light source of one embodiment directs light at the unit dose blister at an angle of less than the predefined threshold, the component of the light that extends parallel to the support surface is generally the largest component, such as in terms of the intensity of the light.

Various light sources 58 may be employed in order to illuminate the unit dose package. In one embodiment, however, the light source has a relatively small divergence angle. For example, the light source may be a light emitting diode (LED) or a line or other array of LEDs. In another embodiment, the light source may include a remote light source, such as a laser diode, that delivers light proximate to the support surface 50 by means of one or more optical fibers. The light source, such as the LED(s) or the output facet of the optical fiber(s), may be positioned proximate one side of the support surface as shown in FIG. 3. Alternatively, the light source can include a plurality of light sources positioned circumferentially about all or at least a portion of the support surface.

Referring now to operation 24 of FIG. 2 and to the exemplary system 48 depicted in FIG. 3, one or more unit dose packages are initially supported upon a support surface 50. As noted above, a unit dose package generally refers to a unit dose of medication for one or more oral solids of the same or different strength, form or type that has been sealed in a package. For example, a unit dose package may be a unit dose blister. A unit dose blister includes a support member formed, in one example, of foil or paper lidding material and a cavity sealed to the support member in which the medication is disposed. In one embodiment, the cavity is formed of vinyl, plastic or other like material and generally conforms to the shape of the medication. The support member of one embodiment is relatively flat or planar and may carry information relating to the medication, e.g., information identifying the medication, its dosage, etc., such as on the opposite side from the cavity that houses the medication. The medication information may be provided in the form of an identification code 16 which, in turn, may be provided in various manners including, for example, printed indicia, a barcode, a radio frequency identification (RFID) code or the like. As shown in FIG. 3, the unit dose packages are generally singulated and may have been returned by a patient who did not take the medication as previously prescribed and dispensed or may be needed for restocking of the system.

Once one or more unit dose packages are supported by the support surface 50 and in response to both backlighting of the support surface and illumination of the support surface with light having an acute angle as indicated by operations 20 and 22 of FIG. 2, respectively, the camera 54 can capture an image of the support surface. See operation 26 of FIG. 2. Since the unit dose packages and, more particularly, the planer support members of the unit dose packages are generally opaque, the image captured by the camera in response to the backlighting depicts the unit dose packages as dark regions upon the otherwise illuminated support surface, as shown in FIG. 4.

As depicted in FIG. 3, the system 48 may include a computing device 56 that, in one embodiment, is configured to review the image captured by the camera 54 and to detect the locations of the unit dose packages. See operation 28 of FIG. 2. The computing device may be embodied as various processing means including any device or circuitry embodied in hardware, software or a combination of hardware and software that is configured to perform the corresponding functions, such as a processor, a coprocessor, a controller or various other processing devices including integrated circuits such as, for example, an ASIC (application specific integrated circuit), an FPGA (field programmable gate array) or the like. In an exemplary embodiment, the processor may be configured to execute instructions stored in a memory device or otherwise accessible to the processor.

The unit dose packages may have various orientations upon the support surface 50. With respect to unit dose blisters, for example, the unit dose blisters may have a first orientation in which the cavity housing the medication faces upward, that is, away from the support surface, and a second configuration in which the support member faces upwards with the cavity that houses the medication facing downward toward the support surface.

The response of the unit dose package to the illumination with light having an acute angle differs depending upon the orientation of the unit dose package. In this regard, in instances in which the planer support member faces upwards with the cavity housing the medication facing downwards toward the support surface 50, a small percentage of the light, if any, is reflected since the planer support member generally lies in the same plane or nearly the same plane as the support surface. In other words, because of the low angle of the incident light to the support surface, the incident light also defines a low angle, if not an angle of 0°, with respect to the planar support member such that little, if any, of the incident light reflects from the support member, as shown, for example, in the image of FIG. 4.

However, in instances in which the cavity that houses the medication is facing upwards with the planer support member resting on the support surface 50, at least some of the light incident upon the cavity will be reflected and will define a distinctive pattern indicative of the orientation of the unit dose package. As described above, the cavity generally conforms to the shape of the medication and, as such, may have a rounded shape or at least a rounded upper surface (that is, the portion of the cavity surface furthest from the support member). As a result of the relatively low angle of the light source with respect to the support surface, the light is generally incident upon the side surfaces (which may or may not be tapered or rounded) and the rounded upper surface of the cavity. In response to the light incident thereupon, the cavity generally reflects one portion of the light, such as in an upward direction away from the support surface, while permitting another portion of the light to be refracted and to propagate through the wall of the cavity, that is, through the vinyl, plastic or other material forming the cavity. The light that propagates through the wall of the cavity may then propagate through the void within the cavity in which the medication is housed prior to contacting and propagating though another wall of the cavity with at least a portion of the light that propagates through the other wall of the cavity being refracted in an upward direction opposite the support surface. The light that is reflected and/or refracted by the cavity in an upward direction away from the support surface may form a predefined shape, such as a circular, elliptical or other annular shape, as shown in FIG. 5, or at least a portion of a circular, elliptical or other annular shape as a result of the reflection and refraction from the cavity walls. In this regard, the annular shape formed by the reflection and/or refraction of the light from the cavity walls may be attributable to the corresponding annular shape of the cavity walls (when taken in cross-section in a plane parallel to the support surface) seen by the light propagating through the cavity.

The camera 54 of this embodiment is also configured to detect the light following its redirection, such as by reflection and/or refraction, by the unit dose package in the image captured by operation 26 of FIG. 2. One exemplary image captured by a camera is shown in FIG. 5. In response to the image captured by the camera, the image may be reviewed to determine the presence or absence of a predefined pattern that is indicative of the redirection of the light by a unit dose package in a cavity-up orientation. For example, the image may be reviewed to determine if the image includes a complete or partial circular, elliptical or other annular shape that is created by a unit dose package oriented with the cavity facing upwards away from the support surface 50.

The image may be reviewed and the predefined pattern(s) may be detected in various manners. For example, the image may be reviewed and the predefined pattern(s) may be recognized in a manual manner. Alternatively, the computing device 56 may analyze the image and identify any predefined pattern(s) present in the image in an automated manner, such as in accordance with image or pattern recognition techniques. See, for example, operation 30 of FIG. 2.

Based upon the prior determination of the respective locations of the unit dose packages, such as provided by operation 28 in response to back lighting of the support surface 50, it may be determined, such as by the computing device 56, which ones, if any, of the unit dose packages are oriented with the cavity facing upwards away from the support surface, with the remainder of the unit dose packages being considered to be oppositely oriented with the cavity facing downwards toward the support surface. For example, in instances in which a predetermined pattern is recognized, the computing device 56 may determine which one of the unit dose packages is associated with, e.g., created, the pattern based upon a correspondence between the relative location of the predetermined pattern and the respective locations of the unit dose packages. This unit dose package will then be considered to be oriented with the cavity facing upwards, with the remainder of the unit dose packages being considered to be oriented with the cavity facing downwards. Similarly, if the image includes two or more of the predetermined pattern, the computing device may determine which one of the unit dose packages is associated with each of the predetermined patterns, again typically based upon a correspondence between the relative location of each predetermined pattern and the respective locations of the unit dose packages. The unit dose packages (equal in number to the number of predetermined patterns) that are associated with the predetermined patters will then be considered to be oriented with the cavity facing upwards with the remainder of the unit dose packages being considered to be oriented with the cavity facing downwards. Conversely, if the image does not include the predetermined pattern, it is determined, such as by the computing device, that any unit dose packages identified in response to the back lighting are oriented with the cavity facing downwards.

In one embodiment in which the unit dose packages are processed in an automated fashion, such as by a robotic system, and it has been determined that a unit dose package is present upon the support surface and has a predetermined orientation, such as an orientation in which the cavity is facing downwards toward the support surface 50, the computing device 56 may determine both the location and the orientation of the unit dose package based upon the image captured at operation 26 including, for example, the location of the centroid or center of the unit dose package as shown by operation 32. A picking system 60, such as a pick-and-place device, may be responsive to directions from the computing device which instruct the picking system to engage the unit dose package with the predetermined orientation as shown in operation 34 of FIG. 2. While a picking system may engage a unit dose package in various manners, the picking system of one embodiment includes an end effector configured to be positioned proximate the unit dose package and to then draw a vacuum which secures the unit dose package to the end effector. The picking system can then remove the unit dose package from the support surface and may then place the unit dose package in a desired location, such as the respective tray or other container within the robotic system that stores the medication in the dosage housed by the unit dose package, prior to repeating the process for any other unit dose packages that likewise have the desired orientation. See operation 38 of FIG. 2.

In order to facilitate movement of the end effector of the picking system 60 to a position proximate the unit dose package, the location of the unit dose package upon the support surface 50 may be determined. In this regard, the computing device 56 of one embodiment is configured to determine the location of the unit dose packages, such as in response to back lighting of the support surface and illumination of the unit dose packages with light having an acute angle, as depicted by operations 28, 30 and 32 of FIG. 2. The computing device of this embodiment may therefore direct the picking system 60 to move, such as by moving its end effector, to a position proximate the location of the unit dose package that has also been determined to be in the desired orientation. In one embodiment, the computing device may direct the picking system to move to a position proximate the center or centroid of a respective unit dose package. As such, the picking system can effectively engage the unit dose package and can then reposition the unit dose package, as desired.

One the picking system 60 has engaged a unit dose package, but prior to the placement of the unit dose package within a respective tray, the picking system may position the unit dose package proximate a reader 62, such as a bar code reader, an RFID reader or the like. In particular, the picking system may position a unit dose package such that the identification code, typically carried by the planer support member, faces or is otherwise readable by the reader. The reader can therefore obtain the identification code from the support member and can provide the identification code to the computing device 56. Based upon the identification code, the computing device can determine the medication carried by the unit dose package, such as by accessing a look up table associating identification codes with respective medications. See operation 36 of FIG. 2. The computing device can also determine the tray or other container for storing the unit dose package of the respective mediation, such as by referencing another look up table of medications and the locations of their respective trays or other containers. Based upon the identification of the medication and the location of the respective tray or other container, the computing device can then instruct the picking system to move the unit dose package to the respective tray or other container and to deposit the unit dose package, such as by discontinuing the vacuum, within the tray or other container. See operation 38 of FIG. 2.

This process of engaging a unit dose package that is oriented in a predetermined manner, such as with the cavity facing downward, determining the medication housed by the unit dose package and then appropriately depositing the unit dose package within the respective tray or other container may be repeated for each unit dose package upon the support surface 50 that is oriented in the same predetermined manner. See operation 40 of FIG. 2. Thereafter, if one or more unit dose packages remain upon the support surface such as one or more unit dose packages having a different orientation, such as with the support member positioned downward facing the support surface and the cavity positioned upward, the system 48 may recirculate the remaining unit dose packages, such as by being moved to a conveying system which may alter the orientation of the unit dose packages prior to returning the unit dose packages to the support surface. See operation 42 of FIG. 2. Alternatively, the system may include a pick-and-place machine which has the ability to engage the remaining unit dose packages and place the unit dose packages to a secondary device which could invert the unit dose packages such that the pick-and-place machine could then re-pick each unit dose package and present the unit dose package to a reader 62, such as a bar code reader, an RFID reader or the like. The pick-and-place machine of this embodiment may also be configured to separate unit dose packages that are initially overlapping or stacked upon one another to facilitate automated processing as described above. Thereafter, the process described above and depicted in FIG. 2 for determining the orientation of the unit dose packages and, in some embodiments, for thereafter selectively picking suitably oriented unit dose packages may be repeated, such as until all unit dose packages have been appropriately restocked.

By determining the orientation of a unit dose package, such as in an automated fashion, the system and method of embodiments of the present invention facilitate the efficient handling of unit dose packages by permitting the unit dose packages that are properly oriented to be processed while re-circulating and potentially reorienting the unit dose packages that were previously improperly oriented. As such, a restocking or other unit dose package handling process may be performed in a more fully automated fashion and, therefore, more efficiently. While an embodiment has been described above in which the unit dose packages oriented with the cavity facing downward were determined to have the desired orientation and to be engaged by the picking system 60, other embodiments may be configured such that unit dose packages oriented with the cavity facing upward are determined to have the desired orientation and to be engaged and further processed by the picking system.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of determining an orientation of a unit dose package, the method comprising:
    supporting a unit dose package upon a support surface, wherein the unit dose package (a) defines a cavity having a predefined pattern and an opening, (b) comprises a medication disposed in the cavity, (c) comprises a substantially opaque support member sealed to the cavity covering the opening, and (d) is configured to (i) redirect the predefined pattern of the cavity indicating that the unit dose package has a predetermined orientation in an instance in which the opaque support member is in contact with the support surface and the cavity is not in contact with the support surface and (ii) not redirect the predefined pattern of the cavity indicating that the unit dose package has a predetermined orientation in an instance in which the cavity is in contact with the support surface and the opaque support member is not in contact with the support surface;
    directing light at the unit dose package upon the support surface, wherein directing light comprises directing light along a path that defines an acute angle of less than a predefined threshold with respect to the support surface;
    detecting the light following redirection by the unit dose package to permit the orientation of the unit dose package to be determined based at least in part upon the presence or absence of a predefined pattern created by the light following redirection by the unit dose package, wherein detecting the light comprises capturing an image;
    determining whether the image comprises a predefined pattern indicating that the unit dose package has a predetermined orientation; and
    engaging the unit dose package so as to remove the unit dose package from the support surface in an instance in which the unit dose package is determined to have a particular predetermined orientation.

2. The method according to claim 1, wherein the predefined pattern comprises an at least partially annular pattern.

3. The method according to claim 1, further comprising back lighting the unit dose package by providing illumination through the support surface.

4. The method according to claim 3, further comprising:
    capturing an image of the unit dose package while being back lit; and
    locating the unit dose package based upon the image of the unit dose package while being back lit.

5. The method according to claim 1, wherein directing light at the unit dose package comprises directing the light along a path that has a component that extends parallel to the support surface.

6. A system for determining an orientation of a unit dose package, the system comprising:
- a support surface configured to support a unit dose package, wherein the unit dose package (a) defines a cavity having a predefined pattern and an opening, (b) comprises a medication disposed in the cavity, (c) comprises a substantially opaque support member sealed to the cavity covering the opening, and (d) is configured to (i) redirect the predefined pattern of the cavity indicating that the unit dose package has a predetermined orientation in an instance in which the opaque support member is in contact with the support surface and the cavity is not in contact with the support surface and (ii) not redirect the predefined pattern of the cavity indicating that the unit dose package has a predetermined orientation in an instance in which the cavity is in contact with the support surface and the opaque support member is not in contact with the support surface;
- a light source configured to direct light at the unit dose package, wherein the light source is configured to direct the light along a path that defines an acute angle of less than a predefined threshold with respect to the support surface;
- a camera configured to (a) detect the light following redirection by the unit dose package and (b) capture an image formed by the light following redirection by the unit dose package, wherein from the image it is determinable that the unit dose package has a predetermined orientation based at least in part upon the presence or absence of a predefined pattern in the image; and
- a picking system configured to engage the unit dose package and to remove the unit dose package from the support surface in an instance in which the unit dose package is determined to have a particular predetermined orientation.

7. The system according to claim 6, wherein the predefined pattern comprises an at least partially annular pattern.

8. The system according to claim 6, wherein the support surface is at least partially translucent, and wherein the system further comprises a back light for illuminating the unit dose package through the support surface.

9. The system according to claim 8, wherein the camera is also configured to capture an image of the unit dose package while illuminated with the back light.

10. The system according to claim 6, wherein the light source is selected from the group consisting of an optical fiber and a light emitting diode (LED).

11. The system according to claim 6, wherein the light source is configured to direct the light along a path that has a component that extends parallel to the support surface.

* * * * *